(12) United States Patent
Allison et al.

(10) Patent No.: US 7,145,875 B2
(45) Date of Patent: Dec. 5, 2006

(54) METHODS AND SYSTEMS FOR PREVENTING SHORT MESSAGE SERVICE (SMS) MESSAGE FLOODING

(75) Inventors: Rick L. Allison, Apex, NC (US); Peter J. Marsico, Carrboro, NC (US)

(73) Assignee: Tekelec, Calabasas, CA (US)

( * ) Notice: Subject to any disclaimer, the term of this patent is extended or adjusted under 35 U.S.C. 154(b) by 1150 days.

(21) Appl. No.: 09/908,753

(22) Filed: Jul. 19, 2001

(65) Prior Publication Data

US 2002/0159387 A1 Oct. 31, 2002

Related U.S. Application Data

(60) Provisional application No. 60/273,442, filed on Mar. 5, 2001.

(51) Int. Cl.
G06F 11/00 (2006.01)
G06F 15/16 (2006.01)

(52) U.S. Cl. ............... 370/230.1; 370/235; 370/386; 709/235; 710/29

(58) Field of Classification Search ......... 370/230.1, 370/310.1, 386, 232, 235, 401, 492; 709/234, 709/235; 710/28, 29
See application file for complete search history.

(56) References Cited

U.S. PATENT DOCUMENTS

| | | | |
|---|---|---|---|
| 5,579,372 A * | 11/1996 | .ANG.str om | ............ 455/412.1 |
| 5,768,509 A | 6/1998 | Gunluk | |
| 5,903,726 A | 5/1999 | Donovan et al. | |
| 5,930,239 A * | 7/1999 | Turcotte | .................... 370/310 |
| 5,987,323 A * | 11/1999 | Huotari | ...................... 455/433 |
| 6,101,393 A | 8/2000 | Alperovich et al. | |
| 6,108,325 A * | 8/2000 | Stephanson et al. | ........ 370/337 |
| 6,108,559 A | 8/2000 | Astrom et al. | |
| 6,125,281 A * | 9/2000 | Wells et al. | ................. 455/466 |
| 6,175,743 B1 | 1/2001 | Alperovich et al. | |
| 6,223,045 B1 * | 4/2001 | Valentine et al. | ........... 455/466 |
| 6,259,925 B1 * | 7/2001 | Josse | .......................... 455/466 |
| 6,289,223 B1 | 9/2001 | Mukherjee et al. | |
| 6,301,484 B1 * | 10/2001 | Rogers et al. | .............. 455/466 |
| 6,400,942 B1 * | 6/2002 | Hansson et al. | ......... 455/426.1 |
| 6,563,830 B1 * | 5/2003 | Gershon et al. | ....... 370/395.53 |
| 6,795,708 B1 * | 9/2004 | Patel | .......................... 455/450 |
| 6,865,191 B1 * | 3/2005 | Bengtsson et al. | .......... 370/475 |
| 2001/0005678 A1 | 6/2001 | Lee | |
| 2001/0006897 A1 | 7/2001 | Kang et al. | |
| 2001/0041579 A1 | 11/2001 | Smith et al. | |

* cited by examiner

*Primary Examiner*—Afsar Qureshi
(74) *Attorney, Agent, or Firm*—Jenkins, Wilson, Taylor & Hunt, P.A.

(57) ABSTRACT

A short message service (SMS) flood control routing node includes an SMS flood control module that receives short message service messages, determines the presence of short message service flooding, and takes appropriate action, such as discarding short message service messages that result in flooding. The presence of short message service message flooding may be determined by maintaining a count of short message service messages addressed to a particular called party within a time period. If the count exceeds a threshold, the short message service message that caused the count to exceed the threshold may be discarded. The routing node may generate a message the originator of a short message service message flood and/or to an enforcement agency.

45 Claims, 9 Drawing Sheets

METHODS AND SYSTEMS FOR PREVENTING SHORT MESSAGE SERVICE (SMS) MESSAGE FLOODING

RELATED APPLICATIONS

This application claims the benefit of U.S. Provisional Patent Application No. 60/273,442 filed Mar. 5, 2001, the disclosure of which is incorporated herein by reference in its entirety.

TECHNICAL FIELD

The present invention relates to methods and systems for controlling the delivery of short message service messages to a subscriber in a mobile communications network. More particularly, the present invention relates to methods and systems for preventing a mobile subscriber from being overwhelmed or flooded by the simultaneous or near simultaneous delivery of a large volume of SMS messages.

BACKGROUND ART

Short message service, which was first introduced by European wireless network operators in 1991, enables mobile subscribers to easily send and receive text messages via a wireless handset. As the convergence of wireless communication networks and Internet data networks has increased, the sending and receiving of SMS messages via computer terminals has also become commonplace. Although specifications and industry standards related to SMS are constantly evolving and being modified, SMS messages have traditionally been used to convey readable text information, where the text may include any combination of alphanumeric characters. After the initial text messaging application, service providers began focusing on using SMS as a means of eliminating alphanumeric pagers by permitting two-way general purpose messaging and notification services. One service that has been provided using SMS is voice mail notification service. As technology and networks continued to mature, a variety of services were introduced, including electronic mail (email) and fax integration, paging integration, interactive banking, and information services such as stock quotes, news highlights, etc.

SMS delivery service provides a mechanism for transmitting "short" messages to and from SMS-capable terminals (e.g., wireless handsets, personal computers, etc.) via the signaling component of the wireless communication network. With particular regard to the sending and receiving of SMS messages by a wireless handset, a wireless network provides the transport facilities necessary to communicate short messages between a short message service center (SMSC) and a wireless handset. A short message service center functions as a store and forward platform for short messages. In contrast to earlier text message transmission services, such as alphanumeric paging, SMS technology is designed to provide guaranteed delivery of an SMS message to a destination. That is, if a temporary network failure prohibits the immediate delivery of an SMS message, then the short message is stored in the network (i.e., at the SMSC) until the destination becomes available. Another of the key and distinguishing characteristics of SMS service with respect to previously available message communication services is that an active mobile handset is able to receive or transmit a short message at any time, regardless of whether or not a voice or data call is in progress.

SMS can be characterized as an out-of-band packet delivery technique with low per-message bandwidth requirements. Hence, SMS services are appealing to network owners and operators. FIG. 1 is a network diagram illustrating an SMS implementation in a global system for mobile communication (GSM) wireless network. It will be appreciated that a functionally similar SMS architecture could also be employed in non-GSM wireless networks. In any event, FIG. 1 includes a wireless communication network, generally indicated by reference numeral 100. Wireless network 100 includes a sending mobile terminal 110 that formulates and sends SMS messages and a base station system 112 that manages the network-to-air interface and reliably transmits the SMS message into the core wireless network. In this particular example, the receiving end of the network includes a base station system 126 and a receiving mobile terminal 128. Wireless network 100 also includes a pair of mobile switching centers (MSCs) 114 and 124, a pair of signal transfer points (STPs) 116 and 122, a short message service center 118 and a home location register (HLR) 120. SMSC 118 is responsible for relaying, storing, and forwarding short messages between sending and receiving SMS terminals. HLR 120 is a database platform used for permanent storage and management of mobile subscriber profiles and locations. HLR databases permanently store information about subscribers that belong to the same network as the HLR. A database element known as a visitor location register (VLR) is used to temporarily store information about subscribers who are currently "roaming" in the area serviced by the VLR. The VLR may belong to the subscriber's home network or to a non-home network. VLR databases are typically integrated within MSC network elements. Thus, a stand-alone VLR node is not shown in FIG. 1. The HLR and VLR store information needed to correctly route voice calls or data communications to a mobile subscriber. This information may include an international mobile station identification (IMSI), a mobile identification number (MIN), a mobile directory number (MDN), a mobile station ISDN number (MSISDN), and the identifications of the VLR and MSC with which the subscriber is currently associated.

With particular regard to short message service operations, HLR 120 provides SMSC 118 with network routing information for the receiving mobile subscriber or mobile terminal 128. In certain cases, HLR 120 may inform SMSC 118, which has previously initiated unsuccessful short message delivery attempts to a specific mobile station, that the mobile station is now recognized by the mobile network to be accessible.

MSC 114 is sometimes referred to as an SMS interworking MSC (SMS-IWMSC) because it is capable of receiving a short message from a wireless network and submitting it to the appropriate SMSC. In practice, SMS-IWMSC nodes are typically integrated with an MSC in the network, but may also be integrated with the SMSC. MSC 124 is sometimes referred to as an SMS gateway MSC (SMS-GMSC) because it is capable of receiving a short message from an SMSC, interrogating a home location register (HLR) for routing information, and subsequently delivering the short message to the "visited" MSC of the recipient mobile station.

FIG. 2 illustrates a communication network 150, which is a variation of the wireless network 100 described above with respect to FIG. 1. Network 150 includes a sending email client 152 and an email server 154, rather than sending mobile station 110 and base station 112. Email server 154 formulates SMS messages from email messages and forwards the SMS messages to SMSC 118. As such, an email message may be generated by a wireline computer terminal residing within a data network (e.g., the Internet) and sent to a mobile terminal within a wireless network as an SMS message.

The signaling infrastructure of wireless network 100 may be based on signaling system no. 7 (SS7), a telecommunications industry standard signaling protocol. SMS service uses the SS7 mobile application part (MAP), which defines the methods and mechanisms of signaling communication in mobile or wireless networks. The MAP protocol utilizes the transaction capabilities application part (TCAP) component of the SS7 protocol. Both North American and international standards bodies have defined a MAP layer using the services of the SS7 TCAP component. The North American standard is published by the Telecommunication Industry Association and is referred to as IS-41 MAP. The international standard is defined by the European Telecommunication Standards Institute and is referred to as GSM MAP.

FIG. 3 is an information flow diagram illustrating the delivery of a short message to a mobile subscriber or terminal in GSM wireless network. This diagram assumes the IWMSC and the GMSC node are both integrated into the SMSC node. Referring to FIG. 3, in step 1, a short message, such as a text message, is formulated by a sending mobile terminal and is transmitted via a signaling network to an MSC node. In response to receiving the short message, the MSC formulates a MAP-SEND-INFO-FOR-MO-SMS query message and transmits the message to the VLR node with which the mobile is currently registered (step 2). The VLR responds to the query and, if the receiving mobile subscriber (MS) is registered, provides the MSISDN corresponding to the IMSI to the MSC. Upon receiving the MS information, the MSC transmits the short message in a MAP-MO-FORWARD-SHORT-MESSAGE message to the SMSC (step 3). The SMSC sends a MAP-SEND-ROUTING-INFO message to the HLR of the SMS recipient using the recipient's MSISDN (step 4). The HLR responds with the IMSI of the recipient and the MSC with which it is currently registered. If the information indicates that the recipient is available (i.e. currently registered with an MSC and turned on with sufficient memory), the SMSC then transmits the short message to the MSC in a MAP-MT-FORWARD-SHORT-MESSAGE (step 5), and transmits a delivery report to the sending MSC (step 6). It will be appreciated that an SMSC attempts to deliver a short message to a receiving MS whenever the MS is registered and available (i.e. turned on with sufficient memory), even when the MS is engaged in a voice or data call. Such service is referred to as point-to-point delivery service and is accomplished via the use of the Short Message Delivery-Point-to-Point (SMD-PP) and ForwardShortMessage mechanisms in IS-41 and GSM, respectively.

In step 7, the MSC queries the VLR with which the recipient is currently registered with a MAP-SEND-INFO-FOR-MT-SMS message. The VLR returns location information associated with the receiving mobile subscriber (e.g., the MSISDN number associated with the receiving mobile subscriber). Using the information obtained from the VLR database, paging and authentication operations are initiated between the MS and the base station. Once the receiving MS has been authenticated and located, the MSC transmits the short message to the mobile (step 8). In step 9, information associated with the disposition or status of the SMS delivery attempt is returned to the SMSC.

It will be appreciated that such delivery status information may be used by the SMSC to ensure or guarantee the delivery of a particular message. That is, when a short message delivery attempt by the SMSC fails due to a temporary network failure, the SMSC may request that it be notified by the HLR when the indicated mobile subscriber becomes accessible. Such "message waiting" functionality is achieved using the SMS notification indicator in IS-41 and set message waiting data in GSM.

From the discussion of SMS operation fundamentals presented above, it will be appreciated that the SMS components of a wireless communication network will diligently attempt to deliver every SMS message received by the network. While such guaranteed delivery service is an attractive feature for legitimate mobile subscribers, the guaranteed delivery service may also cause a mobile subscriber's handset or terminal to be flooded messages in a manner that significantly inconveniences the subscriber or potentially even temporarily disables the subscriber's communication terminal. Furthermore, from a network operations perspective, SMS flooding incidents could have a significantly negative impact on overall network performance. Such SMS message flooding could be executed with malicious intent, or could simply be the unintentional result of a commercial advertising campaign. Accordingly, there exists a long-felt need for novel methods and systems for preventing an SMSC and/or a mobile subscriber from experiencing a mass delivery or flooding of SMS messages.

DISCLOSURE OF THE INVENTION

According to one aspect, the present invention includes a signaling message routing node for transmitting and receiving short message service (SMS) data packets via a communications network. The routing node includes an SMS flood control database that contains information which is used to determine whether a receiving or called party is being flooded with SMS messages. The information stored in the flood control database may be indicative of the average rate at which SMS messages are being sent or delivered to a mobile subscriber. In the event that the average delivery rate value exceeds a predetermined maximum or threshold value, SMS message delivery service to the called party is temporarily suspended. Subsequent SMS messages received at the routing node of the present invention that are addressed to the suspended called party may be discarded.

An SMS flood control application associated with the routing node may generate a new SMS message addressed to the sending or calling party associated with a discarded message. This new SMS message notifies the sending or calling party that delivery of the discarded SMS message was unsuccessful. The SMS flood control application of the present invention may also examine sending party, calling party, and/or routing information contained in an SMS message received during a flooding episode to determine the origin of a flooding attack. As such, it may be possible for an SMS flood control application of the present invention to identify the particular network, network elements, or communication terminal(s) from which an SMS flooding attack is being staged. If the origin of the flooding attack can be determined, a new SMS message can be generated for notifying one or more network operators of the incident so that appropriate steps can be taken to mitigate or terminate the attack.

Accordingly, it is an object of the present invention to prevent a short message service subscriber from being flooded with a large number of SMS messages in a short period of time.

It is another object of the present invention to prevent a short message service center from being flooded with a large number of SMS messages in a short period of time.

It is another object of the present invention to provide a network routing node that facilitates the enforcement of SMS message flood prevention measures;

It is another object of the present invention to identify the sending or calling party responsible for an SMS message flooding incident.

It is another object of the present invention to notify the sending or calling party of an SMS message associated with an SMS message flooding incident that the offending SMS message(s) have been discarded.

It is another object of the present invention to notify a network operator of the occurrence of an SMS message flooding incident so that steps may be taken by the operator to mitigate or terminate the incident.

Some of the objects of the invention having been stated hereinabove, other objects will be evident as the description proceeds, when taken in connection with the accompanying drawings as best described hereinbelow.

BRIEF DESCRIPTION OF THE DRAWINGS

A description of the present invention will now proceed with reference to the accompanying drawings of which.

DETAILED DESCRIPTION OF THE INVENTION

Figure 4:
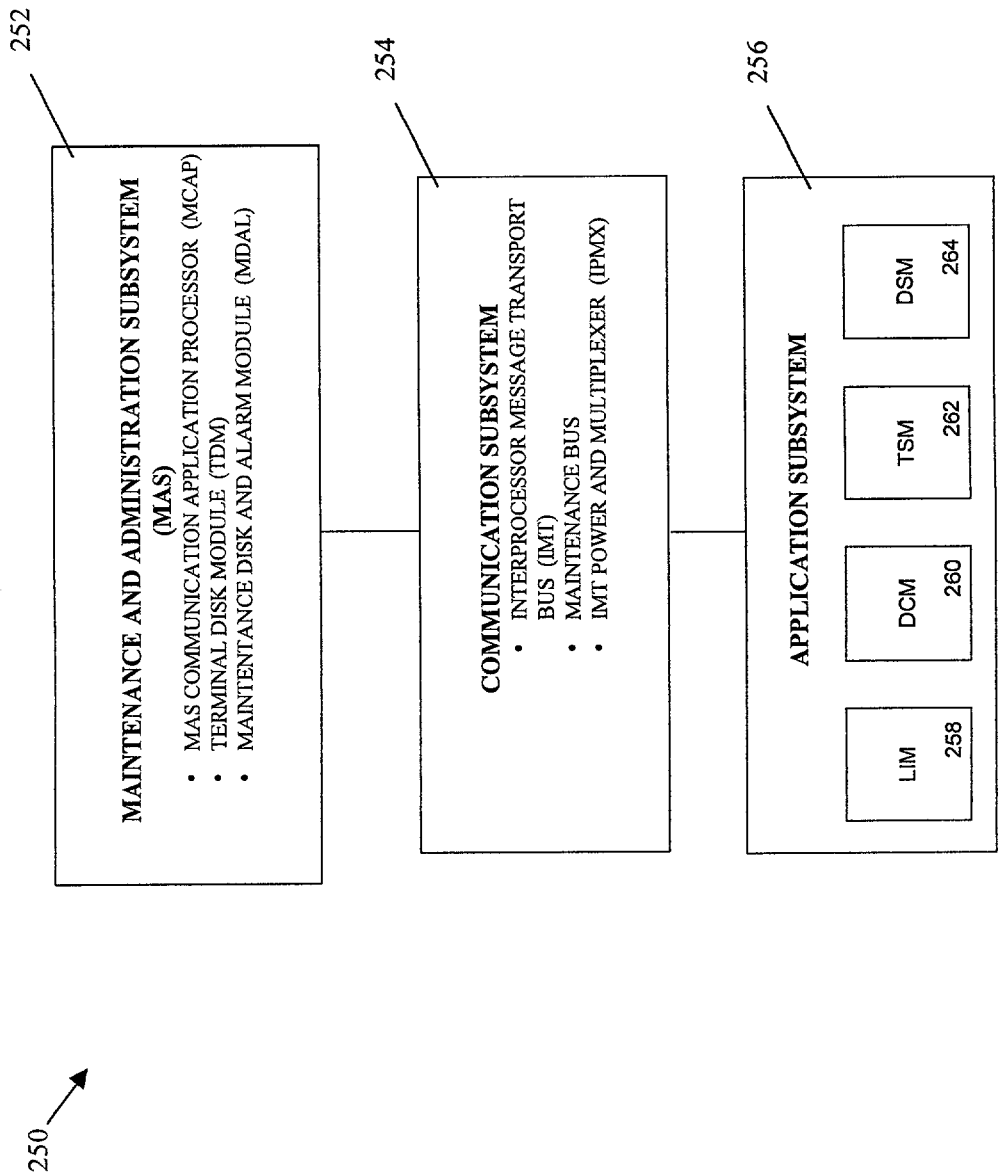
FIG. 4 is block diagram of a signaling gateway routing node suitable for use with embodiments of the present invention.

Disclosed herein are several embodiments of the present invention, some of which may include an underlying hardware platform that performs functions similar to that of a traditional telecommunications network packet routing switch, such as a signaling gateway (SG) routing node. Each of the integrated routing node embodiments described below, includes an underlying hardware platform similar to that of high performance signal transfer point (STP) and SG products marketed by Tekelec of Calabasas, Calif., the EAGLE® STP and IP[7] SECURE GATEWAY™, respectively. FIG. 4 is a block diagram of a signal transfer point or signaling gateway platform suitable for use with embodiments of the present invention. In FIG. 4, a routing node 250 includes the following subsystems: a maintenance and administration subsystem (MAS) 252, a communication subsystem 254 and an application subsystem 256. MAS 252 provides maintenance communications, initial program load, peripheral services, alarm processing and system disks. Communication subsystem 254 includes an interprocessor message transport (IMT) bus that is the main communication bus among all subsystems in the routing node 250. The IMT bus may include two 125 Mbps counter-rotating serial rings.

Application subsystem 256 includes application cards or printed circuit boards capable of communicating with the other cards through the IMT bus. Numerous types of application cards can be incorporated into 250, including: a link interface module (LIM) 258 that provides SS7 links and X.25 links, a data communication module (DCM) 260 that provides an Internet Protocol (IP) interface using transmission control protocol (TCP) or other transport layer protocol, and an translation services module (TSM) 262 that provides global title translation, gateway screening and other services. A database services module (DSM) 264 may also be provided to support triggered local number portability service, as well as advanced database services, such as the SMS flood control application described herein.

Integrated SMS Flood Control Routing Node Architecture

Figure 5:
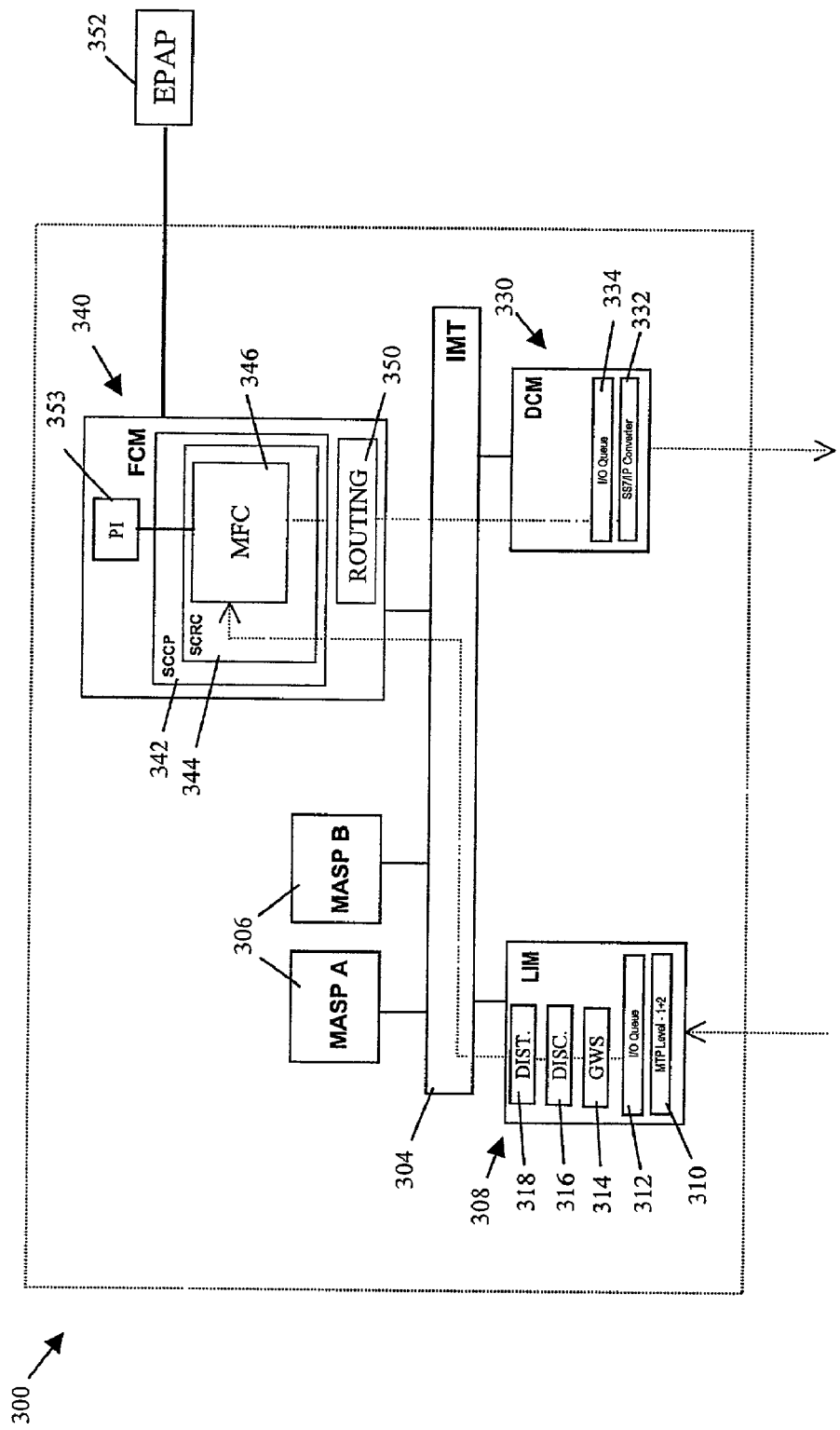
FIG. 5 is a schematic diagram of a signaling gateway routing node including an SMS flood control module (FCM) according to an embodiment of the present invention.

FIG. 5 illustrates a signaling gateway 300 including an internal SMS flood control module according to an embodiment of the present invention. In the illustrated embodiment, SG 300 includes an interprocessor message transport bus 304 that is the main communication bus among all internal subsystems within SG 300. A pair of maintenance and administration subsystem processors 306, an SS7-capable link Interface module 308, an IP-capable data communication module 330, and an SMS flood control module (FCM) 340 are connected to IMT bus 304. These modules maybe physically connected to the IMT bus 304 such that signaling and other types of messages may be routed internally between all active cards or modules. For simplicity of illustration, only single LIM, DCM, and FCM cards are shown in FIG. 5. However, it should be appreciated that the distributed, multi-processor architecture of SG node 300 facilitates the deployment of multiple LIM, DCM, FCM and other cards, all of which can be simultaneously connected to and communicating via IMT bus 304.

MASP pair 306 provide maintenance communications, initial program load, peripheral services, alarm processing and system disks. As the MASP pair are not particularly relevant to a discussion of SMS flood control application functionality, a detailed discussion of their design and operation is not provided herein.

Focusing now on LIM card functionality, in the illustrated embodiment, LIM 308 is comprised of a number of subcomponents including an SS7 MTP level 1 and 2 process 310, an I/O buffer or queue 312, a gateway screening (GWS) process 314, an SS7 discrimination process 316, and a distribution process 318. MTP level 1 and 2 process 310 provides the facilities necessary to send and receive digital data over a particular physical medium. MTP level 1 and 2 process 310 also provides error detection, error correction, and sequenced delivery of SS7 message packets. I/O queue 312 provides for temporary buffering of incoming and outgoing signaling message packets. GWS process 314 may examine a received message packet and determine whether the message is to be allowed into the switch for processing and/or routing. Discrimination process 316 performs a discrimination function to determine whether an incoming SS7 message packet requires internal processing or is simply to be through switched, i.e., routed to another node. In one embodiment, discrimination process 316 examines a service indicator octet (SIO) value in the received message packet in order to determine whether internal SCCP-type processing is required. Distribution process 318 handles the internal distribution of SS7 message packets that require additional processing prior to final routing.

DCM 330, as shown in FIG. 5, includes an SS7/IP converter 332 and I/O queue 334. SS7/IP converter 332 converts between SS7 and IP protocol stacks to allow transport of SS7 messages over an IP network. Exemplary protocols that may be implemented by SS7/IP converter 332 include TALI (as described in IETF RFC 3094) over TCP/IP and SCTP (as described in IETF RFC 2960) over IP. I/O queue 334 stores messages to be processed by higher layers. It will be appreciated that the message packets received and transmitted by a DCM card may include transport adapter layer interface (TALI) protocol messages, session initiation protocol (SIP), M2UA, M3UA, SUA, SCTP, H.323 or other signaling protocols that may be transported via TCP/IP or similar IP-based protocols.

In general, an SMS flood control module (FCM) includes applications and databases that may be used to perform SMS flood control. FCM 340 shown in FIG. 5 includes a signaling connection control part sub-module 342, which further includes a subsystem controller known as a signaling connection routing controller (SCRC) 344. Responsibilities of the SCRC 344 include directing an incoming SS7 message packet to an SMS message flood control (MFC) application 346 and creating a new message packet in response to information returned by MFC application 346. This ability to create a new message in response to information returned from SMS flood control application 346 is a significant aspect of the present invention. SS7 message packets leaving SCRC 344 are received and further processed by routing process 350. Routing process 350 is responsible for the external routing of SS7 message packets that have been processed by SMS MFC application 346 and/or do not require additional processing by the SG node 300. That is, routing process 350 determines to which LIM or DCM card an SS7 message packet should be routed for subsequent outbound transmission from the SG node. It will also be appreciated from FIG. 5 that in one embodiment, FCM 340 is coupled to and serviced by an external provisioning application platform (EPAP) subsystem 352 via an Ethernet connection. EPAP subsystem 352 is responsible for administration and maintenance of at least some of the SMS flow control data resident on FCM 340.

SMS Flood Control Module Architecture

As discussed above, a significant problem associated with currently offered SMS services involves an SMS recipient's inability to control the flow of SMS messages to his or her communication terminal. This shortcoming has the potential of becoming greatly amplified as the generation of SMS message traffic outside of the traditional PSTN network environment continues to increase. As such, it will be appreciated that one of the primary objectives of a routing node including an SMS flood control module according to an embodiment of the present invention is to provide a method by which a network operator can quickly and easily control the rate at which SMS messages are delivered to an SMS service subscriber. A network operator may also provide an individual SMS subscriber with the ability to directly control the rates at which SMS type messages are delivered to their communication terminal by granting the SMS subscriber access to the FCA data.

In FIG. 5, FCM 340 may receive an SMS message that has been internally routed, via IMT bus 304, from a communication module such as a LIM or DCM. FCM 340 includes one or more data tables stored in memory that contain the information for implementing the SMS message flood control functionality described above. Table 1 shown below illustrates a simplified table structure including exemplary information usable by FCM 340 in performing SMS flood control according to an embodiment of the present invention.

TABLE 1

Flood Control Data

| KEY(s) | | | | | DATA | |
| --- | --- | --- | --- | --- | --- | --- |
| CgPA | CdPA | OPC | DPC | CID | SMS# | Threshold |
| 9194605500 | * | * | * | * | 2 | 75 |
| 9194691300 | * | * | * | * | 12 | 75 |
| * | 9194690000 | * | * | * | 1 | 5 |
| * | * | 1-1-1 | * | * | 23 | 124 |
| * | * | * | 2-2-2 | 221 | 66 | 250 |

The flood control table structure depicted in Table 1 is presented primarily for the purposes of illustration and that practical implementation of a flood control application of the present invention may involve a more complex data structure, such as a tree structure. Such complex data structures could be necessary depending upon the particular performance requirements of a given network implementation.

In any event, the sample data table structure shown in Table 1 contains a number of key or index fields including: a sending or calling party identification field, a receiving or called party identification field, an originating point code (OPC) field, a destination point code (DPC) field, and a carrier identification (CID) field. In a signaling system 7 signaling environment, SMS flood control data that may be stored in the sending or calling party identifier field may include a calling party address (CgPA) parameter, a mobile station integrated services digital network number, an international mobile station identifier number, or a mobile identification number. In a SIP environment, the sending or calling party field may store a SIP identifier, such as a SIP URL.

The data stored in the sending or calling party field may be used to identify the source of SMS messages that flood a particular network or mobile subscriber. For example, SMS flood control module 340 may maintain a count of SMS messages received within a particular time period from a particular message originator. The message originator may be an individual or a network, depending on the content of the sending party identification field. If the count exceeds a threshold, SMS flood control module 340 may notify the sender and/or an enforcement agency.

The receiving or called party identifier field may store called party address (CdPA) parameters, IMSIs, MSISDNs, or SIP identifiers associated with receiving mobile stations. The data stored in the called party field may be used to prevent SMS message flooding of a particular mobile station. For example, SMS flood control module 340 may maintain a count of SMS messages received by a particular mobile station. If the count exceeds a predetermined threshold within a predetermined time period, SMS flood control module 340 may discard SMS messages to the terminal being flooded.

The OPC field may store point codes associated with SMS message originators. For example, if it is known that a particular network frequently causes SMS flooding, the point code of a switch in that network may be provisioned in Table 1 to monitor and control flooding originating from a node in that network. In the event that an SMS flood control application of the present invention is implemented or practiced in a non-SS7 communication network, the data stored in OPC field would correspond to a network address, such as an IP address, that is valid in the network within which the invention is being practiced.

The DPC field in Table 1 may store point code values of recipient nodes in a network that are subject to SMS message flooding. For example, the DPC field may store the point code of an SMSC in a particular network to prevent SMS message flooding of the SMC. Once again, if an SMS flood control application of the present invention is implemented in a non-SS7 communication network, the data stored in DPC field would correspond to a network address, such as an IP address, that is valid in the network within which the invention is being practiced. Finally, carrier ID (CID) field may be used to determine whether a carrier identified in the carrier ID field of an SMS flood control message has an SMS flood control agreement with the owner of routing node 300.

In addition to the screening or key fields, each entry or record in Table 1 contains an SMS message counter field and an SMS message delivery rate threshold field. The SMS message counter field stores information related to the number of SMS messages received and processed by SG node 300 for each particular entry. FCM 340 may include a timer used in conjunction with the value stored in the message counter field to calculate the rate of SMS message delivery. For example, in one embodiment FCM 340 may periodically zero the values in the SMS counter fields upon expiration of the timer. In such an embodiment, the values stored in the threshold field may be set to the maximum allowable number of SMS messages for the specified time period. In an alternate embodiment, FCM 340 may calculate the average or instantaneous delivery rate of SMS messages for each entry. In this embodiment, the value stored in the threshold field may be indicative of the maximum instantaneous or average rate.

The sending party, receiving party, OPC, and DPC fields in Table 1 may be provisioned manually by a network operator or an end user. However, in addition to or instead of such manual provisioning, these fields may be provisioned automatically by flood control module 340. For example, when flood control module 340 receives an SMS message, flood control module 340 may perform a lookup in the flood control table based on data extracted from the message. If flood control module 340 fails to locate a matching entry, flood control module may automatically add an entry to the flood control table using the parameters from the received message. The next time a message is received having the same parameters, flood control module 340 will locate the previously created entry and increment the message count. The threshold field for automatically-created entries may be set to a default value determined by the network operator. In this manner, FCM 340 automatically provisions itself to monitor new sources of SMS message flooding.

According to another aspect of the invention, FCM 340 may include a provisioning interface 353 that allows a user or a network operator to provision values in the flood control table. Provisioning interface 353 may be any type of interface that allows a user or network operator to provision or alter flood control data in the SMS flood control table. Examples of such interfaces may include text-based interfaces, graphical interfaces, or interfaces that include a combination of text and graphics. Interface 353 may be accessed using any suitable means, such as FTP or HTTP via the Internet.

Using a table-driven architecture to perform SMS flood control greatly facilitates provisioning and updating of SMS flood control data. A network operator can increase allowable thresholds of SMS messages in a network as equipment is upgraded without rewriting and re-compiling flood control software. Similarly, an end user can increase SMS flood control thresholds as mobile terminal processing and storage capacity improves. The combination of a provisioning interface with a table-driven flood control architecture allows both end users and network operators to easily control the flow of SMS messages.

The flood control table data structure and data presented in Table 1 are merely illustrative of the basic information necessary to provide the required SMS flood control functionality. In practice, the actual record structures and overall database design may vary according to particular implementation and system performance requirements.

SMS Flood Control Module Operation

Figure 6:
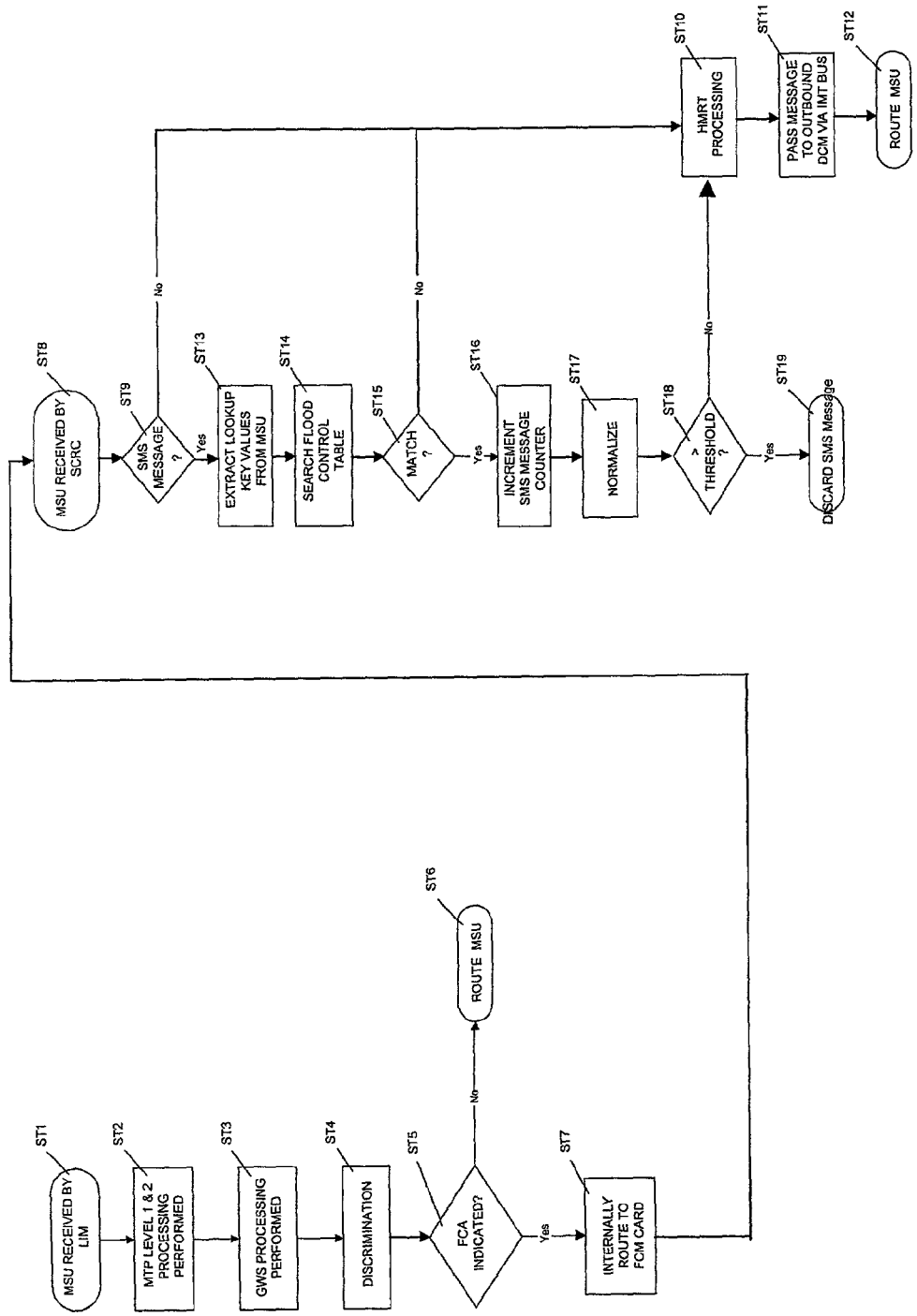
FIG. 6 is a flow chart illustrating the processing of an SMS message by a routing node including an SMS flood control module according to an embodiment of the present invention.

FIG. 6 is a flow chart illustrating exemplary steps performed by a routing node including an SMS flood control module in processing SMS messages according to an embodiment of the present invention. For purposes of illustration, it is assumed that the SMS message being processed is an SS7 transaction capabilities application part (TCAP) or mobile application part-based SMS message. However, an SMS flood control module of the present invention may be used in a non-SS7 environment to process SMS messages that utilize non-SS7 signaling protocols (e.g., SIP, SUA/SCTP, H.323, TALI, etc.). In any event, the block diagram presented in FIG. 5 may be used in conjunction with the processing flow chart of FIG. 6 to better understand the operation of a routing node including an SMS flood control module according to an embodiment of the present invention. The dashed line in FIG. 5 illustrates the path that an SMS message may follow through the routing node.

Beginning at inbound LIM 308, an SS7-based SMS signaling message is received (ST1), and SS7 MTP Level 1 and 2 processing is performed on the incoming signaling message packet by the MTP Level 1 and 2 process 310, as indicated by step ST2. When MTP Level 1 and 2 processing is complete, the signaling message packet is temporarily buffered in I/O queue 312 before being passed up the stack to GWS process 314, where various parameters in message are examined to determine whether the message is to be allowed into the switch (ST3). Such gateway screening parameters may include originating point code, destination point code, and carrier ID.

Once the message successfully passes GWS processing, the message is directed to discrimination process 316, as indicated in step ST4. Discrimination process 316 examines the SMS signaling message packet and determines whether the packet requires further processing by SG node 300. In one embodiment, discrimination process 316 may examine destination point code and service indicator octet parameters contained within the message transfer part header of an SS7 signaling message packet. In the event that a signaling message includes a DPC value corresponding to the SS7 network address of SG node 300 and an SIO value corresponding to that of an SCCP message, the message is identified as potentially requiring SMS flood control processing. In the example shown in FIG. 5, it is assumed that discrimination process 316 examines the DPC and SIO values associated with the received SMS signaling message and subsequently determines that flood control processing of the message packet may be required (ST5). If discrimination process 316 determines that a received message does not require SMS flood control processing, the message may be routed from SG node 300 via a communication module such as a LIM or DCM (ST6). In the event that SMS flood control processing may be required, the SMS message is passed to distribution process 318. Distribution process 318 may internally distribute the SMS message from the receiving LIM 308 to the FCM 340 via IMT bus 304, as indicated in step ST7.

In step ST8, the SMS signaling message arrives at FCM 340 and SCCP process 342 receives the packet. Within SCCP process 342, the message packet is passed to the SCRC controller 344. In step ST9, SCRC controller 344 decodes and examines packet content information contained within the SMS signaling message header in order to verify that the message is an SMS message. In one embodiment, such a determination is made through examination of a subsystem (SSN) parameter that is contained in the SCCP portion of an SMS message. While different networks may define and recognize different SSN values to represent MAP type messages (SMS is a MAP message), an SSN value typically used by wireless network operators to indicate a MAP type message is SSN=5. In another embodiment, the SMS message identification function may be performed by examining the operation code in the MAP portion of the SMS message. The operation code may indicate that the message is a ForwardShortMessage message, which is used in GSM networks to deliver short messages. Hence, it may be particularly important that FCM 340 identify these types of messages for flood control purposes. The operation code parameter can be used to select ForwardShortMessage messages for processing. Other messages may be routed normally.

In the event that a message is determined to be of a type other than SMS, the message may be passed to routing process 350 for routing from SG node 300, as indicated by steps ST10, ST11, and ST12. However, if a message is determined to be an SMS message, data used to perform SMS flood control processing is next extracted from the message (ST13). In the exemplary implementation described herein, such data may include a CgPA parameter, a CdPA parameter, an OPC parameter, a DPC parameter, and a CID parameter, all of which correspond to key fields in the sample flood control table (Table 1) that resides on or is accessible by FCM 340. It should be noted that the MAP MSISDN, IMSI or MIN may be used, although they are not shown in the example table. As such, some or all of the data extracted from the SMS message is used to search the flood control table for a matching entry or record (ST14 and ST15). If a matching record or entry is not located, the message is passed to routing process 350 for routing from SG node 300, as indicated by steps ST10, ST11 and ST12.

As discussed above, if a matching entry is not located, a new entry may be created for the received message. In the event a matching entry is located in the flood control table, the data contained in the matching entry is used to perform SMS flood control processing.

In one embodiment, SMS flood control processing may include incrementing the value of the SMS message counter field associated with the matching entry (ST16). The incremented SMS message counter field value may then be compared to the threshold field value to determine whether to route or discard the SMS message. It will be appreciated that depending upon the particular implementation, additional calculations may need to be performed to ensure that the SMS message counter value and corresponding threshold value are similarly defined. That is, if a user has specified a threshold of ten SMS messages per minute and the period of the reset timer is anything other than one minute, then the two field values must be normalized before a meaningful comparison can be made (ST17 and ST18).

As indicated above, the data stored in Table 1 may be used by FCM 340 to control SMS flooding in a variety of ways. For example, if a calling party address in a received SMS message matches a value in a calling party identifier field, FCM 340 may determine whether the number of SMS messages received from the particular calling party exceeds the threshold specified in the threshold field. If the number exceeds the threshold, the calling party may be notified and further messages from the particular calling party may be blocked. Such sender-based flood control may be performed for networks or for individual subscribers. In order to perform network-wide sender-based flood control, FCM 340 may keep a count of all messages received from a particular network. In order to perform sender-based flood control on an individual basis FCM 340 may maintain a count of SMS messages from a particular calling party. Either type of sender-based flood control is intended to be within the scope of the invention.

Yet another type of flood control that may be performed by FCM 340 includes recipient-based flood control. Recipient-based flood control may be performed on an individual basis or on a network basis. In order to perform recipient-based flood control on an individual basis, FCM 340 may maintain a count of SMS messages directed to a particular called party within a predetermined time period. In order to perform recipient-based flood control on a network basis, FCM 340 may maintain a count of SMS messages received by a particular network within a predetermined time period. Either type of recipient-based flood control is intended to be within the scope of the invention.

In yet another alternative embodiment, FCM 340 may combine sender and receiver data in received message to perform flood control based on the sender and the intended recipient. This combined type of flood control may be performed on an individual basis or on a network basis by provisioning the appropriate values in Table 1. Thus, FCM 340 according to the present invention is capable of performing sender-based, receiver-based, or sender and receiver-based SMS flood control by provisioning the appropriate values in Table 1.

Returning to FIG. 6, if the SMS message delivery rate does not exceed the threshold value, the message is passed to routing process 350 for routing from SG node 300, as indicated by steps ST10, ST11 and ST12. However, if it is determined that the SMS message delivery rate exceeds the threshold value, the SMS message may be discarded (ST19).

As stated above, SMS flood control module 340 may generate a new message in response to determining that the SMS message delivery rate exceeds the threshold value. Such a new message may be an SMS message that is addressed to the calling or sending party associated with the discarded SMS message. This new SMS message may inform the calling or sending party that the original SMS message was not delivered to the intended recipient and that additional SMS messages should not be sent to the intended recipient for a predetermined timeout period. In addition to or instead of a new message directed to the calling or sending party of the discarded SMS message, a new message may be created to alert a network operator to the SMS message flooding incident. Such a network management message may include information that can be used to identify the origin of an SMS message flooding attack (e.g., CgPA, OPC, CID, etc.) and, as such, may assist a network operator in mitigating or terminating an SMS flooding incident.

Figure 1:
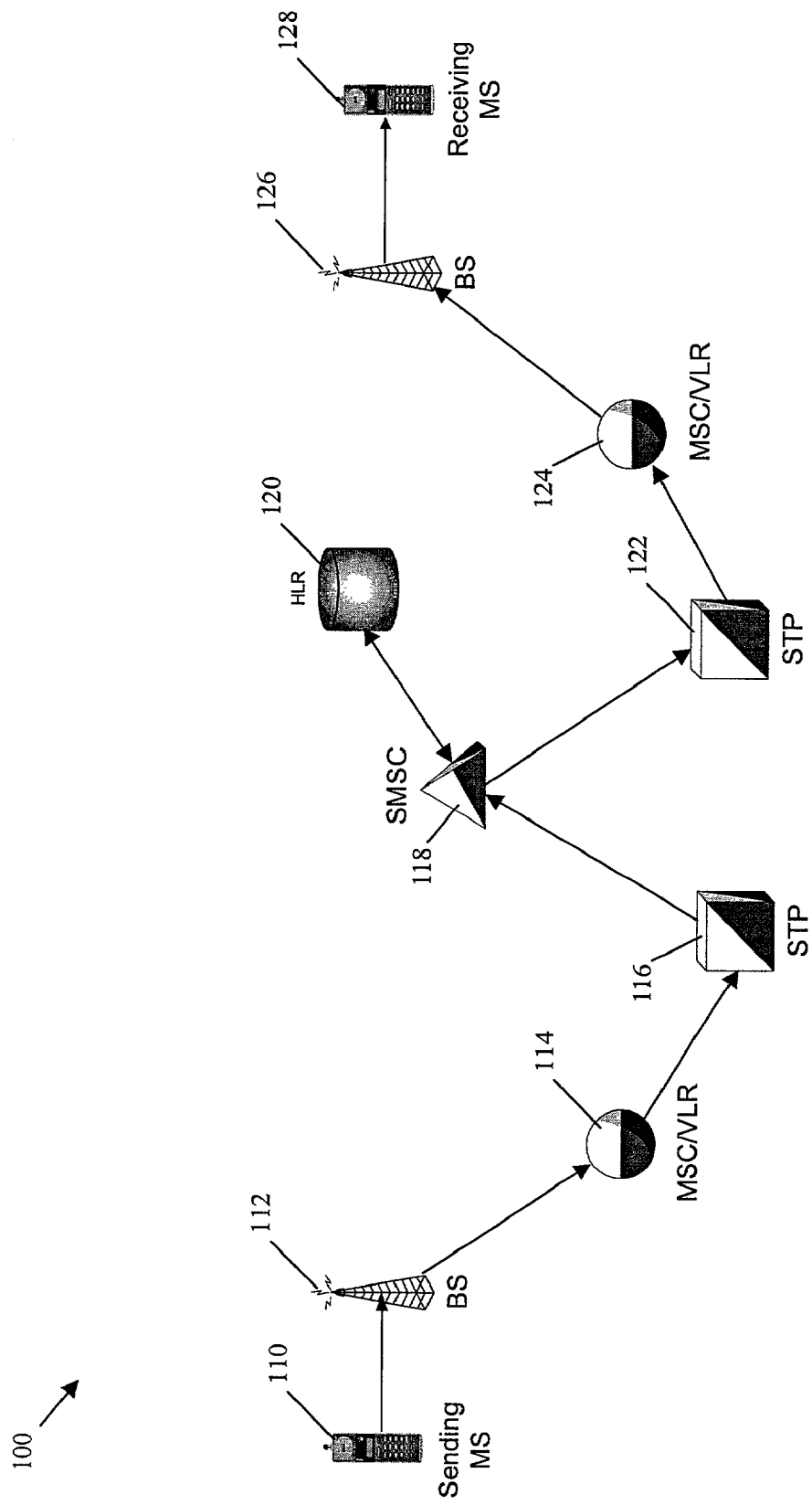
FIG. 1 is a network diagram illustrating conventional network elements associated with handling SMS messages originating from a mobile terminal.
Figure 2:
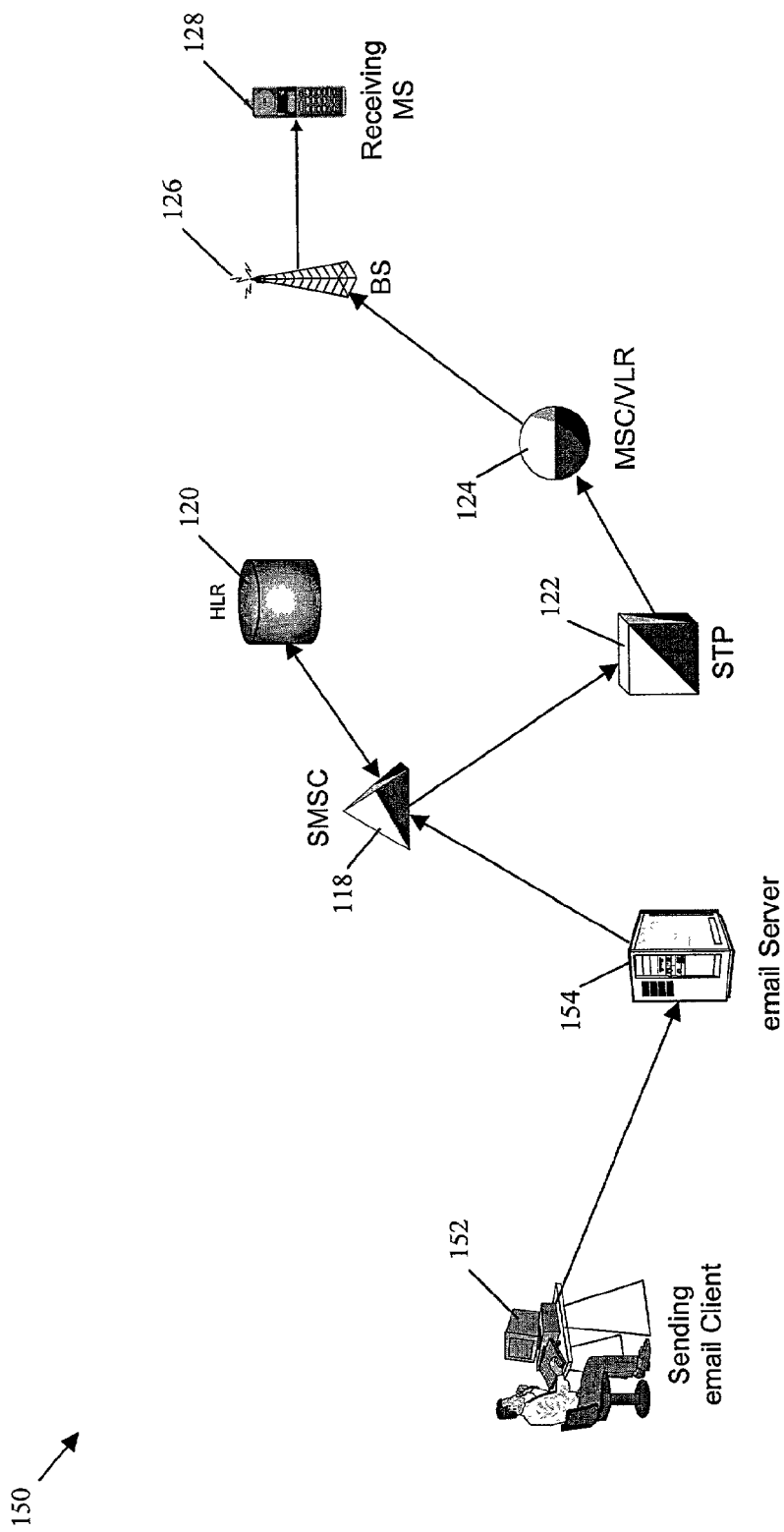
FIG. 2 is a network diagram illustrating conventional network elements associated with handling SMS message originating from an email client.
Figure 3:
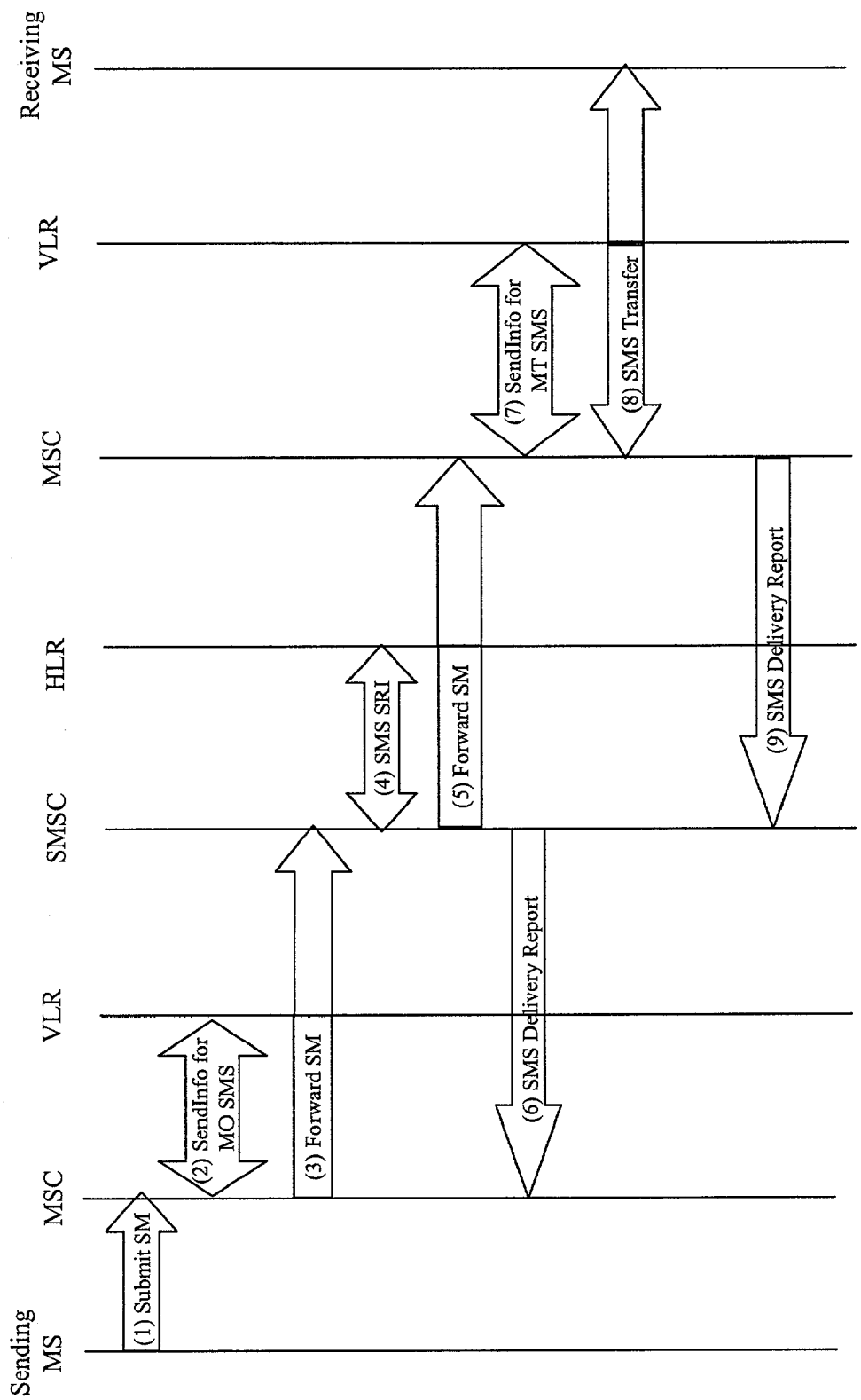
FIG. 3 is a message flow diagram illustrating MAP protocol messages associated with the sending and receiving of an SMS message.
Figure 7:
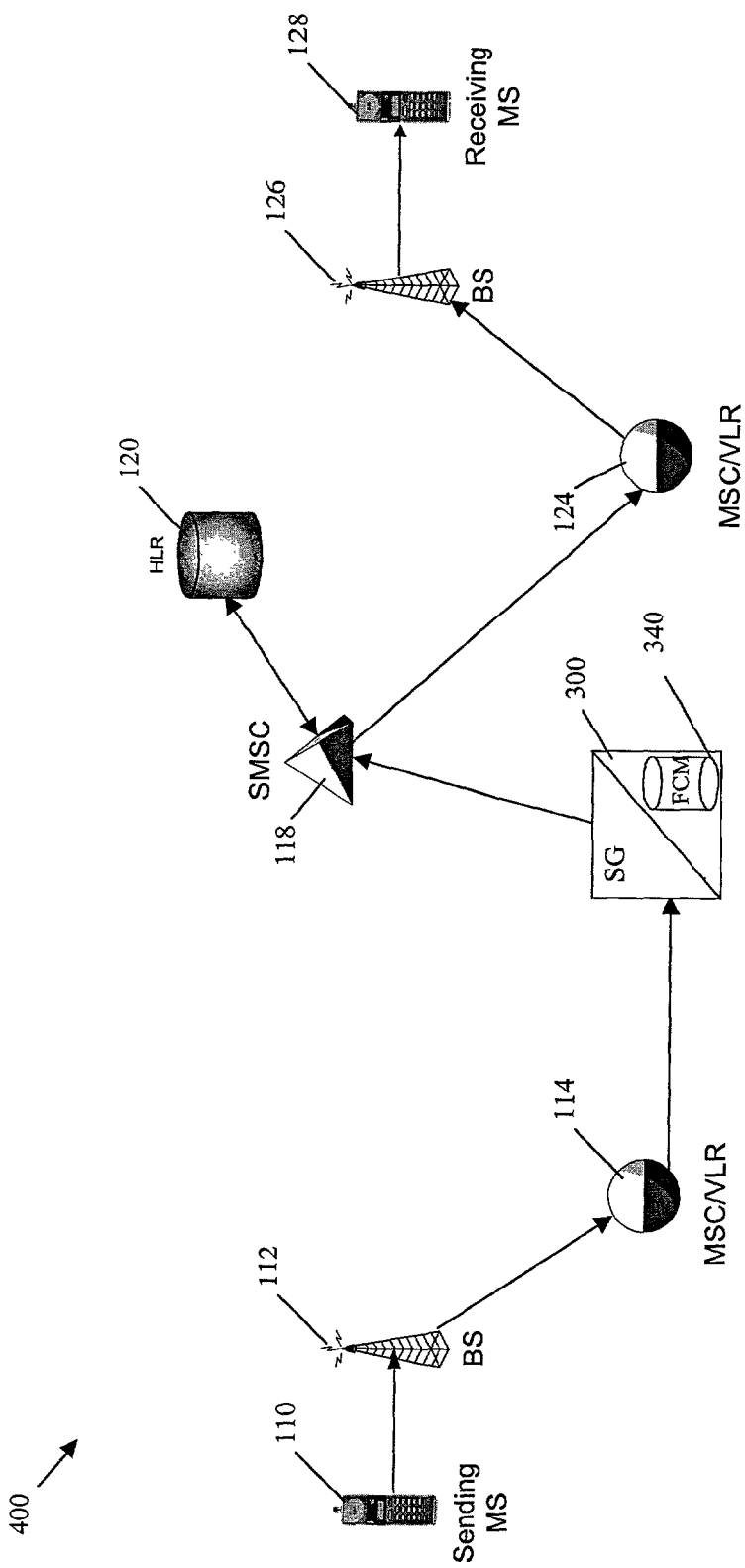
FIG. 7 is a network diagram illustrating a communications network including a routing node having an SMS flood control module according to an embodiment of the present invention.

FIG. 7 illustrates an exemplary wireless communication network 400 including a signaling gateway with an SMS flood control module according to an embodiment of the present invention. In FIG. 7, Network 400 is similar in architecture to communication network 100 illustrated in FIG. 1. However, instead of STP pair 116 and 122 illustrated in FIG. 1, communication network 400 includes SG node 300 including SMS flood control module 340. As such, a mobile subscriber 110 may originate an SMS message destined for another mobile subscriber 128. The SMS message, addressed to MS 128, is received into the wireless network via base station system 112 and is subsequently routed to MSC 114. MSC 114 in turn routes the message to signaling gateway 300. The SMS message is received by signaling gateway 300 and is processed in a manner similar to that described above with respect to FIGS. 5 and 6. In the event that the SMS flood control application within signaling gateway 300 determines that MS 128 is being flooded with SMS messages, the SMS message is discarded and is consequently not delivered to the intended destination. Given the particular network architecture illustrated in this example, the discarding of the SMS message prevents flooding at two critical locations in the network. That is, an SMSC typically serves as an intermediate store and forward buffer element for SMS messages in an SMS capable network. Consequently, all SMS messages destined for MS 128 would first be received, processed, and temporarily buffered by SMSC 118. Since SMS messages that are identified as causing flooding are discarded at SG 300, both the intermediate SMSG 118 and the intended recipient MS 128 are shielded from large volumes of SMS message traffic that would be associated with a flooding incident. Such "downstream" SMS traffic shielding is one of the key beneficial attributes of the present invention.

Stand-alone SMS Flood Control Module Architecture

Figure 8:
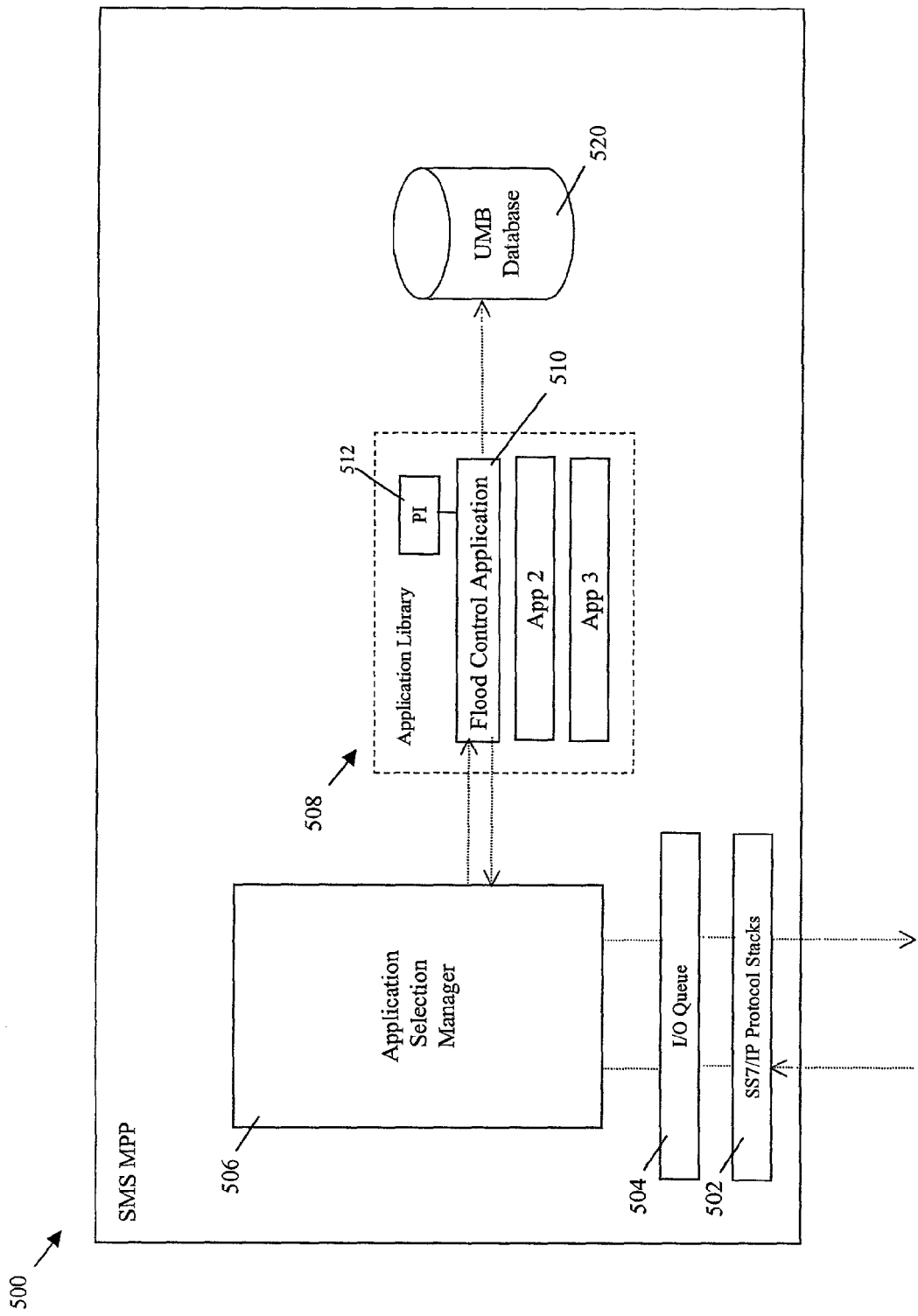
FIG. 8 is a block diagram illustrating a stand-alone SMS message processing platform (MPP) including an SMS flood control module according to an embodiment of the present invention.

Yet another embodiment of the present invention involves the implementation of an SMS flood control module on a stand-alone SMS message processing platform that is not located within a routing node. A functional block diagram of one embodiment of such a message processing platform is shown in FIG. 8. In FIG. 8, SMS MPP 500 includes SS7 and IP protocol stacks 502 and an I/O queue 504. SS7 and IP protocol stacks 502 may be capable of sending and receiving SS7 messages, IP messages, and IP-encapsulated SS7 messages. I/O queue 504 buffers messages waiting to be processed by higher and lower layers. SMS MPP 500 further includes an application selection manager 506 and an application library 508. In this simplified example, application library 508 includes several message processing applications that are adapted to receive and subsequently process a variety of signaling messages, including an SMS flood control application 510. SMS message flood control application 510 may include a provisioning interface 512 that allows a user to provision or changes SMS message flood control data. Provisioning interface 512 may be similar in structure and operation to provisioning interface 353 described above with respect to FIG. 5. Hence, a description thereof will not be repeated herein.

Application selection manager 506 may select an application for processing a received message based on parameters extracted from the message. Table 2 shown below illustrates exemplary parameters that may be used to select the appropriate application.

TABLE 2

Application Selection Data

| | KEY(s) | | | | |
|---|---|---|---|---|---|
| Type | OPC | SLS | DPC | CID | APPLICATION |
| * | 1-1-1 | * | * | * | SMS flood control |
| IAM | * | * | * | 7 | App2 |
| IAM | * | * | 4-4-4 | * | App3 |

From Table 2, parameters that can be used to select the appropriate application include the message type, OPC, DPC, SLS, and carrier ID. These parameters may be used alone or in combination to select the appropriate application.

A usage measurements and billing (UMB) database 520 maintains usage metrics and billing information related to the screening and processing of SMS messages by SMS MPP 500. In one embodiment, UMB 520 10 maintains information associated with screened messages in the form of call detail records (CDRs). Table 3 shown below illustrates exemplary CDR data that may be stored in UMB database 520.

TABLE 3

Usage Measurements and Billing Information

| KEY | | | BILLING RECORD DATA | | |
|---|---|---|---|---|---|
| Date | Time | Application | CdPA | CgPA | Carrier |
| Dec. 01, 2000 | 13:01:24 | Flood-Con | 9194691300 | 9194671100 | 221 |
| Dec. 01, 2000 | 13:01:24 | Flood-Con | 9193457012 | 9194621450 | 636 |
| Dec. 01, 2000 | 13:01:24 | App2 | 9193457894 | 914671230 | 221 |

Each CDR is represented by a row in Table 3. Each CDR includes date, time, and application key fields. Each CDR also includes a called party (CdPA) or receiving party identifier field that contains the phone number or identifier (e.g., email address, URL, etc.) associated with the SMS receiving party, a calling party (CgPA) or sending party identifier field that contains the phone number or identifier (e.g., email address, URL, etc.) associated with the SMS sending party, and a carrier ID field that contains the carrier ID associated with an SMS message. UMB database 520 may also collect and maintain peg count type usage measurements and statistics associated with screened or processed SMS messages.

Stand-alone SMS Flood Control Module Operation

Figure 9:
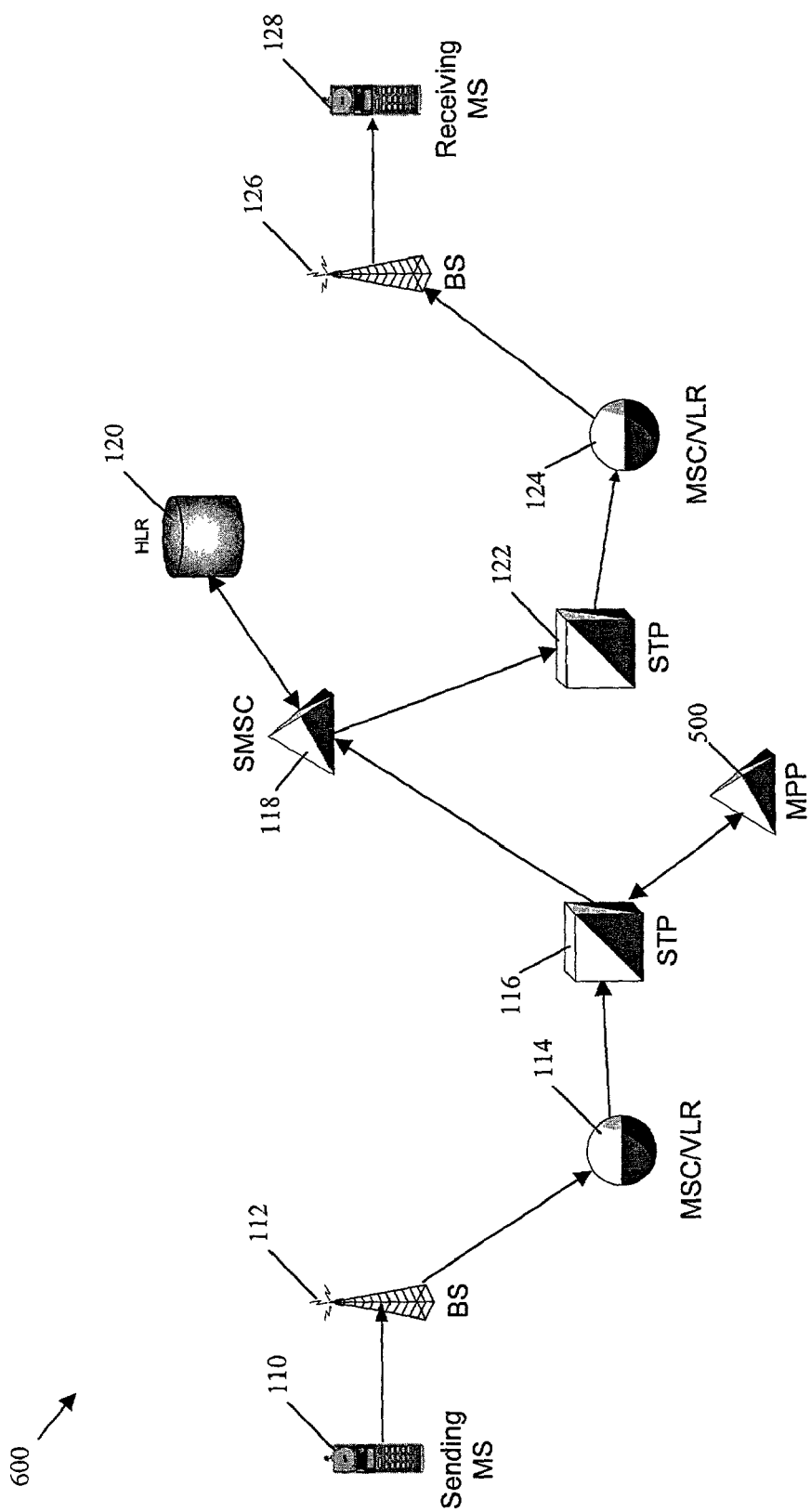
FIG. 9 is a network diagram illustrating a communication network including a stand-alone SMS MPP according to an embodiment of the present invention.

Focusing now on operation of a message processing platform (MPP) embodiment of the present invention, the path of a typical SS7 SMS signaling message requiring SMS flood control processing is traced through a sample communication network 600 shown in FIG. 9. Again, the sample network 600 is similar in architecture to the communication network 100 illustrated in FIG. 1. However, unlike network 100, communication network 600 includes the stand-alone SMS message processing platform (MPP) 500 for providing SMS flood control processing service.

A mobile subscriber 110 may originate an SMS message that is destined for another mobile subscriber 128. The SMS message, addressed to MS 128, is received into the wireless network via base station system 112 and is subsequently routed to MSC 114. In this particular example, MSC 114 routes the message to the signal transfer point 116. If the SMS message is addressed to an SS7 point code associated with the STP 116, the SMS message is received by STP 116, which performs a global title translation (GTT) or other functionally similar re-directing routing address translation operation. Those skilled in the art of SS7 communications will appreciate that GTT is a translation process used to determine the location (e.g., SS7 point code and subsystem) of a message processing platform (e.g., MPP, service control point, database node, etc.). Such GTT functionality is well known and widely deployed in modern communication networks. In any event, as a result of the GTT or GTT-like processing, the SMS message is routed from STP 116 to MPP 500 for SMS flood control processing. At this point, it should be noted that it is also possible that an SMS message could be directly addressed to MPP node 500, in which case no GTT or GTT-like processing would be required by STP 116. In such a scenario, the MPP node 500 would perform the necessary SMS flood control processing as well as any GTT or GTT-like processing required to route the message to SMSC 118.

In the particular example discussed with regard to FIGS. 8 and 9, SMS MPP 500 receives an SMS message packet via an SS7 or IP communication link from STP 116. SS7/IP protocol stacks 502 receive the SS7 message signaling unit (MSU) and remove any headers not required by higher layers. The SMS message is then passed via I/O queue 504 to application selection manager 506. As discussed previously, ASM 506 may examine a number of message parameters and/or message characteristics for the purpose of determining the particular message processing application or applications that are required. Table 2 shown above includes a number of index or key fields by which the table may be searched to determine the particular application that is required to service the received message. These fields may be used alone or in combination as a search or lookup key.

In the example presented in FIG. 9, it is assumed that the originating point code (OPC) address information contained in the received SMS message is 1-1-1. Referring to the sample application selector data shown in Table 2, an OPC value of 1-1-1 indicates the need for SMS flood control processing. As such, the SMS message is passed from ASM 506 to SMS flood control application (FCA) 510. FCA processing then proceeds in a manner similar to the FCA processing described above with regard to the FIG. 5.

In the event that the SMS flood control application residing on SMS MPP node 500 determines that MS 128 is being flooded with SMS messages, the SMS message is discarded and is consequently not delivered to the intended destination. Once again, in such a case, discarding of the SMS message prevents flooding at two critical locations in the network. That is, typically an SMSC serves as an intermediate store and forward buffer element for SMS messages in an SMS capable network. Consequently, all SMS messages destined for MS 128 would first be received, processed, and temporarily buffered by SMSC 118. Since flood related SMS messages are discarded at SG 300, both intermediate SMSC 118 and intended recipient MS 128 are shielded from large volumes of SMS message traffic that would be associated with a flooding incident. Once again, it will be appreciated that such "downstream" SMS traffic shielding is one of the key beneficial attributes of the present invention.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for preventing short message service (SMS) message flooding, the method comprising:
   (a) receiving a first SMS message including called and calling party identification information;
   (b) performing a lookup in a message flood control (MFC) database using at least one of the called and calling party identification information;
   (c) in response to locating a matching entry in the MFC database, using information contained in the matching entry to detect the presence of SMS message flooding, wherein using information in the matching entry to detect the presence of SMS message flooding includes:
       (i) maintaining, in the entry, information indicative of a rate at which SMS messages are being sent or delivered to a mobile subscriber;
       (ii) determining whether the rate exceeds a threshold value; and
   (d) in response to detecting the presence of SMS message flooding, discarding the first SMS message.

2. The method of claim 1 wherein receiving a first SMS signaling message includes receiving a signaling system 7 (SS7) mobile application part (MAP)-based SMS message.

3. The method of claim 2 wherein receiving an SS7 MAP-based SMS message includes receiving an Internet protocol (IP)-encapsulated SS7 MAP-based SMS message.

4. The method of claim 1 wherein receiving a first SMS message includes receiving a session initiation protocol (SIP)-based SMS message.

5. The method of claim 1 wherein the called party identification information includes a mobile subscriber integrated services digital network (MSISDN) number.

6. The method of claim 1 wherein the called party identification information includes an international mobile station identifier (IMSI).

7. The method of claim 1 wherein the called party information includes an email address.

8. The method of claim 1 wherein the called party information includes an Internet protocol (IP) address.

9. The method of claim 1 wherein receiving a first SMS message includes receiving the first SMS message at a network routing node and redirecting the first SMS message to a message processing platform separate from the network routing node.

10. The method of claim 9 wherein redirecting the first SMS message includes examining a destination address contained in the first SMS message.

11. The method of claim 10 wherein the destination address contained in the first SMS message includes an SS7 destination point code (DPC) value.

12. The method of claim 10 wherein the destination address contained in the first SMS message includes an IP address value.

13. The method of claim 9 wherein redirecting the first SMS message includes redirecting the first SMS message based on a message type indicator included within the message.

14. The method of claim 13 wherein the message type indicator includes a subsystem number (SSN) identifier.

15. The method of claim 13 wherein the message type indicator includes a SIP message type identifier.

16. The method of claim 9 wherein redirecting the first SMS message includes examining an origination address contained in the first SMS message.

17. The method of claim 16 wherein the origination address contained in the first SMS message includes an SS7 originating point code (OPC) value.

18. The method of claim 16 wherein the origination address contained in the first SMS message includes an IP address value.

19. The method of claim 1 comprising, in response to locating a matching entry in the MFC database, incrementing an SMS message counter associated with the matching entry.

20. The method of claim 1 comprising, in response to failing to locate a matching entry in the MFC database, inserting a new entry in the MFC database.

21. A method for preventing short message service (SMS) message flooding, the method comprising:
 (a) receiving a first SMS message including called and calling party identification information;
 (b) performing a lookup in a message flood control (MFC) database using at least one of the called and calling party identification information;
 (c) in response to locating a matching entry in the MFC database, using information contained in the matching entry to detect the presence of SMS message flooding; and
 (d) in response to detecting the presence of SMS message flooding, discarding the first SMS message and generating a second SMS message addressed to the calling party associated with the first SMS message.

22. The method of claim 21 wherein the second SMS message notifies the calling party that the first SMS message was not delivered to the called party.

23. A method for preventing short message service (SMS) message flooding, the method comprising:
 (a) receiving a first SMS message including called and calling party identification information;
 (b) performing a lookup in a message flood control (MFC) database using at least one of the called and calling party identification information;
 (c) in response to locating a matching entry in the MFC database, using information contained in the matching entry to detect the presence of SMS message flooding; and
 (d) in response to detecting the presence of SMS message flooding, discarding the first SMS message and generating a second SMS message addressed to a third party.

24. The method of claim 23 wherein the second SMS message notifies the third party of an originator of a flood of SMS messages.

25. The method of claim 23 wherein the third party is a government agency.

26. The method of claim 23 wherein the third party is a network operator.

27. A method for preventing short message service (SMS) message flooding, the method comprising:
 (a) receiving a first SMS message including called and calling party identification information;
 (b) performing a lookup in a message flood control (MFC) database using at least one of the called and calling party identification information;
 (c) in response to locating a matching entry in the MFC database, using information contained in the matching entry to detect the presence of SMS message flooding, wherein using information in the matching entry to detect the presence of SMS message flooding includes determining whether the number of SMS messages received by a called party within a predetermined time period exceeds a threshold number of SMS message; and
 (d) in response to detecting the presence of SMS message flooding, discarding the first SMS message.

28. A method for preventing short message service (SMS) message flooding, the method comprising:
 (a) receiving a first SMS message including called and calling party identification information;
 (b) performing a lookup in a massage flood control (MFC) database using at least one of the called and calling party identification information;
 (c) in response to locating a matching entry in the MFC database, using information contained in the matching entry to detect the presence of SMS message flooding, wherein using information in the matching entry to detect the presence of SMS message flooding includes determining whether the number of SMS messages received from a calling party within a predetermined time period exceeds a threshold number of SMS message; and
 (d) in response to detecting the presence of SMS message flooding, discarding the first SMS message.

29. A method for preventing short message service (SMS) message flooding, the method comprising:
 (a) receiving a first SMS message including called and calling party identification information;
 (b) performing a lookup in a message flood control (MFC) database using at least one of the called and calling party identification information;
 (c) in response to locating a matching entry in the MFC database, using information contained in the matching entry to detect the presence of SMS message flooding, wherein using information in the matching entry to detect the presence of SMS message flooding includes determining whether the number of SMS messages received by a network within a predetermined time period exceeds a threshold number of SMS message; and
 (d) in response to detecting the presence of SMS message flooding, discarding the first SMS message.

30. A method for preventing short message service (SMS) message flooding, the method comprising:
   (a) receiving a first SMS message including called and calling party identification information;
   (b) performing a lookup in a message flood control (MFC) database using at least one of the called and calling party identification information;
   (c) in response to locating a matching entry in the MFC database, using information contained in the matching entry to detect the presence of SMS message flooding, wherein using information in the matching entry to detect the presence of SMS message flooding includes determining whether the number of SMS messages received from a network within a predetermined time period exceeds a threshold number of SMS message; and
   (d) in response to detecting the presence of SMS message flooding, discarding the first SMS message.

31. A method for collecting information that can be used to prevent a calling party who has previously flooded a called party with SMS messages from flooding another subscriber or the network again, the method comprising:
   (a) at a network element, detecting that a calling party identified in a received SMS message is flooding a called party with SMS messages and, in response, entering information for identifying the calling party in a message flood control (MFC) database;
   (b) in response to detecting that the calling party is flooding the called party, checking the MFC database to determine whether the calling party has previously flooded any subscriber identified in the MFC database; and
   (c) in response to locating a matching entry in the MEC database, sending a message to a third party indicating that the calling party is a repeat offender.

32. The method of claim 31 wherein the third party is a network administrator with the capability to remove the offending party's authentication from the network, thereby preventing further access.

33. The method of claim 31 wherein the third party is a network administrator with the capability to enable screening of calls to block the offending party from accessing the network.

34. The method of claim 31 wherein the third party is a government agency.

35. An SMS flood control routing node comprising:
   (a) a first communication module for receiving SMS messages from a network;
   (b) an SMS message flood control (MFC) database for storing information for preventing SMS message flooding; and
   (c) an SMS flood control module for receiving the SMS messages from the first communication module for performing a lookup in the SMS MFC database based on information extracted from the SMS messages and detecting the presence of SMS message flooding wherein detecting the presence of SMS flooding includes:
      (i) maintaining, in the SMS MFC database, information indicative of a rate at which SMS messages are being sent or delivered to a mobile subscriber; and
      (ii) determining whether the rate exceeds a threshold value.

36. The SMS flood control muting node of claim 35 wherein the first communication module is a signaling system 7 (SS7)-capable link interface module (LIM).

37. The SMS flood control muting node of claim 35 wherein the first communication module is a Internet protocol (IP)-capable data communication module (DCM).

38. The SMS flood control routing node of claim 35 wherein the SMS flood control module is located within the SMS flood control routing node.

39. The SMS flood control routing node of claim 35 wherein the SMS flood control module is located external to the SMS flood control routing node.

40. The SMS flood control routing node of claim 35 comprising a provisioning interface for allowing a user to add or modify the data in the SMS flood control database.

41. An SMS flood control routing node comprising:
   (a) a first communication module for receiving SMS messages from a network;
   (b) an SMS message flood control (MFC) database for storing information for preventing SMS message flooding, wherein the SMS flood control information includes the number of SMS messages received within a predetermined time period; and
   (c) an SMS flood control module for receiving the SMS messages from the first communication module for performing a lookup in the SMS MFC database based on information extracted from the SMS messages and detecting the presence of SMS message flooding.

42. An SMS flood control routing node comprising:
   (a) a first communication module for receiving SMS messages from a network;
   (b) an SMS message flood control (MFC) database for storing information for preventing SMS message flooding, wherein the SMS flood control information includes the number of SMS messages received by a particular mobile subscriber within a predetermined time; and
   (c) an SMS flood control module for receiving the SMS messages from the first communication module for performing a lookup in the SMS MFC database based on information extracted from the SMS messages and detecting the presence of SMS message flooding.

43. An SMS flood control routing node comprising:
   (a) a first communication module for receiving SMS messages from a network;
   (b) an SMS message flood control (MFC) database for storing information for preventing SMS message flooding, wherein the SMS flood control information includes the number of SMS messages received from a particular calling party within a predetermined time period; and
   (c) an SMS flood control module for receiving the SMS messages from the first communication module for performing a lookup in the SMS MFC database based on information extracted from the SMS messages and detecting the presence of SMS message flooding.

44. An SMS flood control routing node comprising:
   (a) a first communication module for receiving SMS messages from a network;
   (b) an SMS message flood control (MFC) database for storing information for preventing SMS message flooding, wherein the SMS flood control information includes the number of SMS messages received from a particular network within a predetermined time period; and
   (c) an SMS flood control module for receiving the SMS messages from the first communication module for performing a lookup in the SMS MFC database based on information extracted from the SMS messages and detecting the presence of SMS message flooding.

45. An SMS flood control routing node comprising:
(a) a first communication module for receiving SMS messages from a network;
(b) an SMS message flood control (MFC) database for storing information for preventing SMS message flooding, wherein the SMS flood control information includes the number of SMS messages directed to a particular network element within a time period; and
(c) an SMS flood control module for receiving the SMS messages from the first communication module for performing a lookup in the SMS MFC database based on information extracted from the SMS messages and detecting the presence of SMS message flooding.

* * * * *